US011636578B1

(12) United States Patent
Kurz et al.

(10) Patent No.: US 11,636,578 B1
(45) Date of Patent: Apr. 25, 2023

(54) PARTIAL IMAGE COMPLETION

(71) Applicant: Apple Inc., Cupertino, CA (US)

(72) Inventors: Daniel Kurz, Keaau, HI (US); Gowri Somanath, Santa Clara, CA (US); Tobias Holl, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/238,285

(22) Filed: Apr. 23, 2021

Related U.S. Application Data

(60) Provisional application No. 63/025,231, filed on May 15, 2020.

(51) Int. Cl.
  *G06T 5/00* (2006.01)
  *G06T 3/20* (2006.01)
(52) U.S. Cl.
  CPC .............. *G06T 5/005* (2013.01); *G06T 3/20* (2013.01); *G06T 2207/20084* (2013.01)
(58) Field of Classification Search
  None
  See application file for complete search history.

(56) References Cited

U.S. PATENT DOCUMENTS

| | | | |
|---|---|---|---|
| 7,889,948 | B2 | 2/2011 | Steedly et al. |
| 10,038,887 | B2 | 7/2018 | Gallup et al. |
| 10,264,212 | B1* | 4/2019 | Fleizach ............... H04N 7/0137 |
| 2011/0038523 | A1* | 2/2011 | Boardman ................ G06T 7/90 |
| | | | 382/133 |
| 2015/0110418 | A1* | 4/2015 | Bayram ................ G06T 1/0078 |
| | | | 382/282 |
| 2015/0131924 | A1* | 5/2015 | He ........................ H04N 5/2624 |
| | | | 382/284 |
| 2018/0253820 | A1* | 9/2018 | Knott ........................ G06T 3/60 |
| 2018/0302612 | A1 | 10/2018 | Kopf et al. |
| 2020/0118253 | A1* | 4/2020 | Eisenmann ............. G06T 5/005 |
| 2020/0260063 | A1* | 8/2020 | Hannuksela ......... H04N 13/161 |

OTHER PUBLICATIONS

Zhao, Dan, Guo, Baolong, and Yan, Yunyi; "Parallel Image Completion with Edge and Color Map", School of Aerospace Science and Technology, Xidian University, Sep. 13, 2019; pp. 1-29.
Yu, Jiahui, Lin, Zhe, Yang, Jimei, Shen, Xiaohui, Lu, Xin and Huang, Thomas S.; "Generative Image Impainting with Contextual Attention"; University of Illinois at Urbana-Champaign; arXiv: 1801.07892v2 [cs.CV] Mar. 21, 2018; pp. 1-15.

* cited by examiner

*Primary Examiner* — Aaron M Richer
(74) *Attorney, Agent, or Firm* — Thompson Hine LLP

(57) ABSTRACT

Various implementations disclosed herein include devices, systems, and methods that complete content for a missing part of an image of an environment. For example, an example process may include obtaining an image including defined content and missing parts for which content is undefined, determining a spatial image transformation for the image based on the defined content and the missing parts of the image, altering the image by applying the spatial image transformation, and completing the altered image.

17 Claims, 6 Drawing Sheets ured1 PARTIAL IMAGE COMPLETION

CROSS-REFERENCE TO RELATED APPLICATIONS

This application claims the benefit of U.S. Provisional Application Ser. No. 63/025,231 filed May 15, 2020, which is incorporated herein in its entirety.

TECHNICAL FIELD

The present disclosure generally relates to completing images of a physical environment, and in particular, to systems, methods, and devices that complete content for missing parts of an image of the physical environment.

BACKGROUND

Various techniques are used to complete (e.g., synthesize) image content for missing parts of an image. For example, some techniques use generative adversarial networks (GANs) to generate random images and conditional GANs that are conditioned on the known part of the image, such that the generated image content is not only realistic or plausible by itself but such that it is consistent with the known parts of the image. GAN-based techniques generally learn to generate new data such as images with the same statistics as a training set. For example, a GAN trained on photographs may generate new images that look plausible to human observers, having many real characteristics similar to those of the training photographs. GANs may be used to determine pixel color values (e.g., predicting each of the red, green, and blue color channels) for pixels of an image or part of an image to provide content that looks like a plausible scene. Some existing techniques use regression-based approaches to complete content in an image, for example, regressing to particular color values for each pixel to produce outputs. Other common approaches that can be used to achieve the same include image inpainting, image hole filling, image interpolation, image extrapolation, or the like.

Existing techniques for completing content in images for missing parts of the image may be discontinuous. For example, in some existing methods, neighboring pixels are not generated completely independently from each other. Some of these methods may use inverse or transposed convolutions, image patches, multi-scale image pyramids, and/or image interpolation. These methods may result in smoothness/continuity between neighboring pixels, but may be discontinuous between, e.g., the left-most and the right-most column of an image (e.g., within a 360-view).

SUMMARY

Various implementations disclosed herein include devices, systems, and methods that generate content to fill in a missing part of an image (e.g., a 2D rectangular environment map) that has edges that will be placed adjacent to one another. For example, a completion technique described herein determines a spatial (or geometric) image transformation (which may be just a shift, but also may be any generic image warp), that maximizes the ratio of known pixels at certain image positions (e.g., the left and right image boundaries), given certain constraints on the spatial image transformation (e.g., smoothness). Completing the image may create content at the edges that may not match up well since the completion technique applied to the image may not perform the completion in a way that accounts for those areas being adjacent to one another. To reduce such potential for mismatched content and other seam artifacts, some implementations apply a spatial transformation (e.g., shift the image) prior to completing the image to reduce/minimize the amount of content created at those edges. For example, this may involve shifting an environment map to change the locations of its edges relative to the environment that it depicts. The adjustment may reduce or minimize the amount of content completed at the left and right edges of the image, and consequently reduce the potential for and/or amount of content mismatch that may occur when those edge portions are viewed adjacent to one another. In some implementations, images may be completed by completing content according to implementations disclosed herein in order to provide extended reality (XR) environments that include depictions of physical environments including real physical objects and virtual content for display on mobile and/or head mounted devices (HMDs).

In general, one innovative aspect of the subject matter described in this specification can be embodied in methods that include the actions of obtaining an image including defined content and missing parts for which content is undefined, determining a spatial image transformation for the image based on the defined content and the missing parts of the image, altering the image by applying the spatial image transformation, and completing the altered image.

These and other embodiments can each optionally include one or more of the following features.

In some aspects, the missing parts include pixels for which luminance, depth, color, or texture values are undefined.

In some aspects, the image includes an equirectangular representation representing a 360-degree view of an environment in which left and right edges will be adjacent to one another, a cube map representing the 360-degree view of the environment, a surface representing a tile-able texture in which edges will be adjacent to one another, or a texture of a three-dimensional (3D) mesh having edges that will be adjacent to one another in the 3D mesh.

In some aspects, completing the altered image includes generating new content for only the missing parts of the altered image. In some aspects, completing the altered image includes generating new content for all of the altered image. In some aspects, the new content is generated using a neural network.

In some aspects, the spatial image transformation repositions a portion of the image at one or more edges of the altered image.

In some aspects, the portion of the image is a vertical slice and the spatial image transformation includes shifting the image horizontally so that the vertical slice is at an edge of the image or divided between two edges of the image. In some aspects, the portion of the image is a vertical slice selected based on how much of each vertical slice of multiple vertical slices of the image is defined or undefined.

In some aspects, the image is a two-dimensional (2D) image including distortion resulting from projecting spherical three-dimensional (3D) data to form the 2D image, wherein the spatial image transformation is selected based on the distortion.

In some aspects, the method further includes altering the completed altered image to undo the spatial image transformation.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
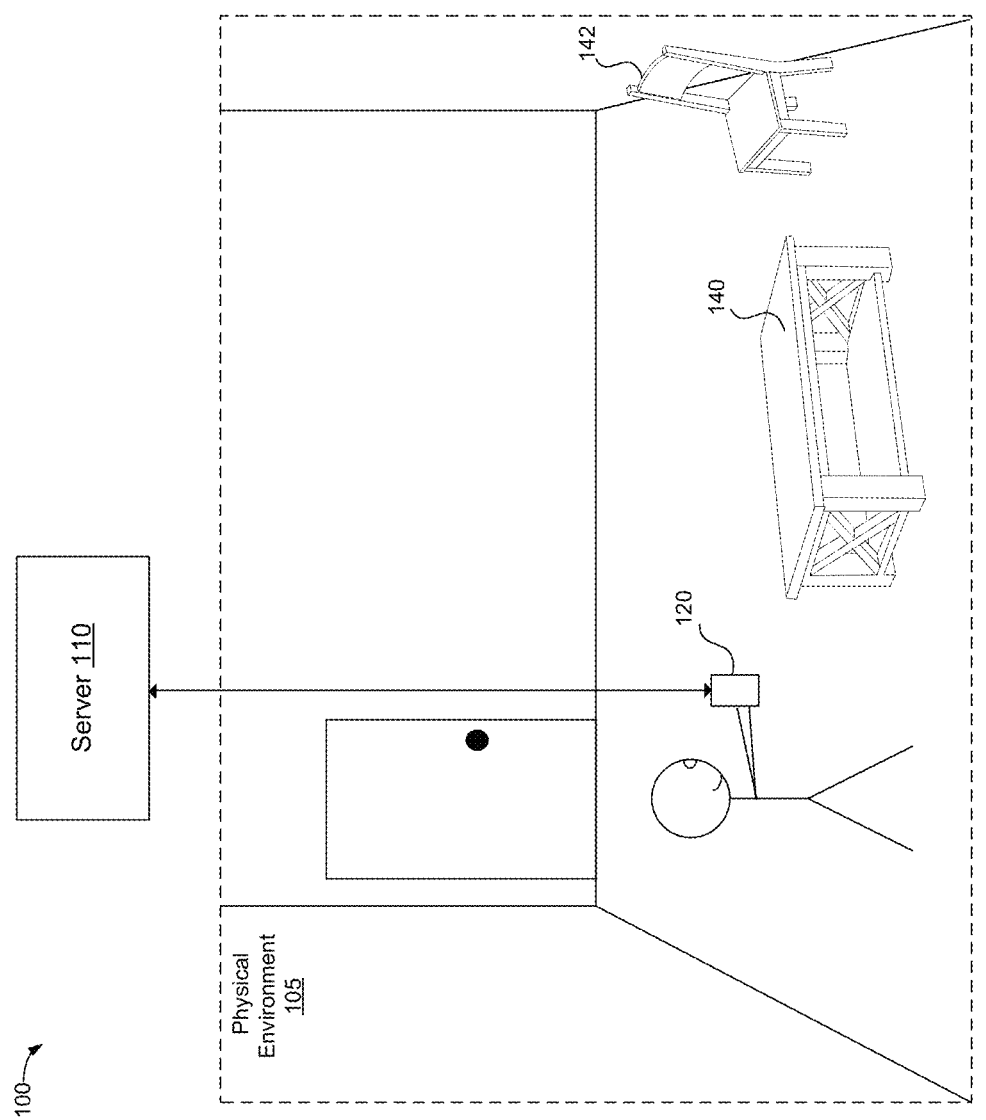
FIG. 1 illustrates an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105 that includes a table 140 and a chair 142. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

In some implementations, the device 120 is a handheld electronic device (e.g., a smartphone or a tablet) configured to present content to the user. In some implementations, the user 102 wears the device 120 on his/her head. As such, the device 120 may include one or more displays provided to display content. For example, the device 120 may enclose the field-of-view of the user 102. In some implementations, the device 120 is replaced with a chamber, enclosure, or room configured to present content in which the user 102 does not wear or hold the device 120.

Figure 2:
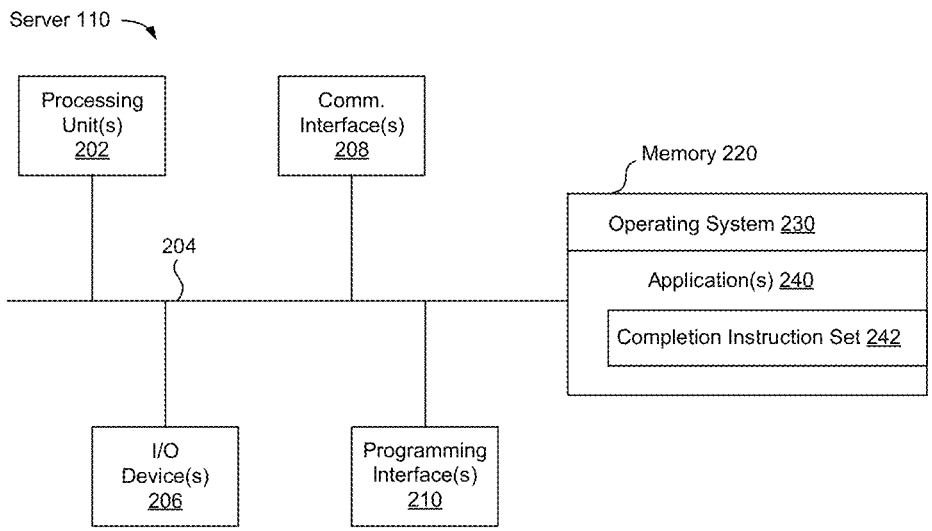
FIG. 2 illustrates an example server in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 includes a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include a completion instruction set 242. The completion instruction set 242 is configured with instructions executable by a processor to acquire image data (e.g., light intensity data, depth data, camera position information, etc.) and generates content to fill in a missing part of an image (e.g., a 2D rectangular environment map) that has edges that will be placed adjacent to one another using one or more techniques disclosed herein. For example, the completion instruction set 242 can create content at the edges that may not match up well since the completion technique applied to the image may not perform the completion in a way that accounts for those areas being adjacent to one another. To reduce the potential for mismatched content and other seam artifacts, the completion instruction set 242 can apply a spatial transformation (e.g., shifts the image) prior to completing the image to reduce/minimize the amount of content created at those edges.

In some implementations, the completion instruction set 242 includes a spatial image transformation instruction set that analyzes the image data to identify where to reposition a portion of the image at one or more edges. For example, the spatial image transformation instruction set can identify which slice of the image data includes the most amount of data (e.g., least amount of missing data). In other words, identify which slice of data would require the least amount of completion. In some implementations, the completion instruction set 242 includes an image alteration instruction set that, for example, can alter or shift the image. For example, an identified slice can be spliced and located on both the far left edge and/or the far right edge of the image (e.g., a 2D rectangular environment map). In some implementations, the completion instruction set 242 includes a completing content instruction set that generates new/additional content for the missing parts of the image. For example, completing content instruction set can generate the missing content located at the identified slice at the far left edge and/or the far right edge of the altered/shifted image.

Although these elements are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
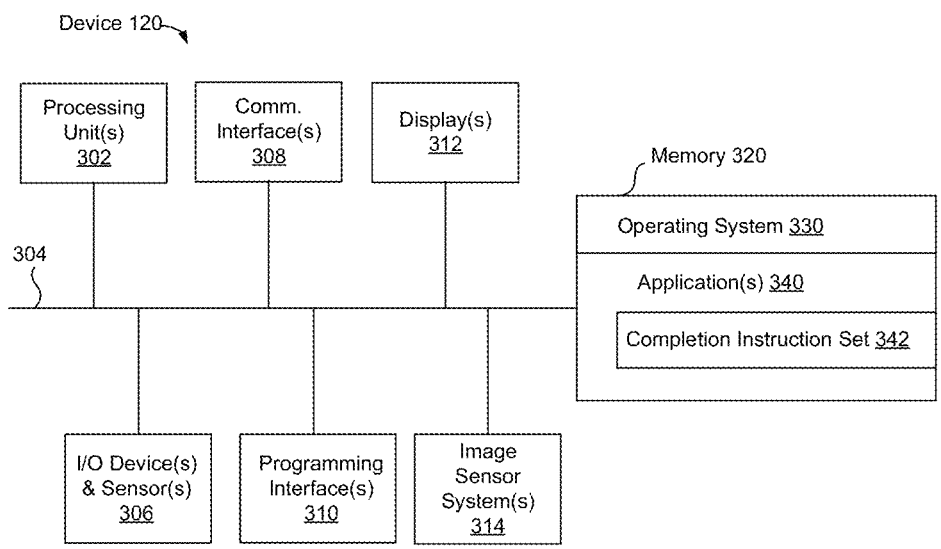
FIG. 3 illustrates an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 includes a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users).

The applications 340 include a completion instruction set 342. The completion instruction set 342 is configured with instructions executable by a processor to acquire image data (e.g., light intensity data, depth data, camera position information, etc.) and generates content to fill in a missing part of an image (e.g., a 2D rectangular environment map) that has edges that will be placed adjacent to one another using one or more techniques disclosed herein. For example, the completion instruction set 342 can create content at the edges that may not match up well since the completion technique applied to the image may not perform the completion in a way that accounts for those areas being adjacent to one another. To reduce the potential for mismatched content and other seam artifacts, the completion instruction set 342 can apply a spatial transformation (e.g., shifts the image) prior to completing the image to reduce/minimize the amount of content created at those edges.

In some implementations, the completion instruction set 342 includes a spatial image transformation instruction set that analyzes the image data to identify where to reposition a portion of the image at one or more edges. For example, the spatial image transformation instruction set can identify which slice of the image data includes the most amount of data (e.g., least amount of missing data). In other words, identify which slice of data would require the least amount of completion. In some implementations, the completion instruction set 342 includes an image alteration instruction set that, for example, can alter or shift the image. For example, an identified slice can be spliced and located on both the far left edge and/or the far right edge of the image (e.g., a 2D rectangular environment map). In some implementations, the completion instruction set 342 includes a completing content instruction set that generates new/additional content for the missing parts of the image. For example, completing content instruction set can generate the missing content located at the identified slice at the far left edge and/or the far right edge of the altered/shifted image.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
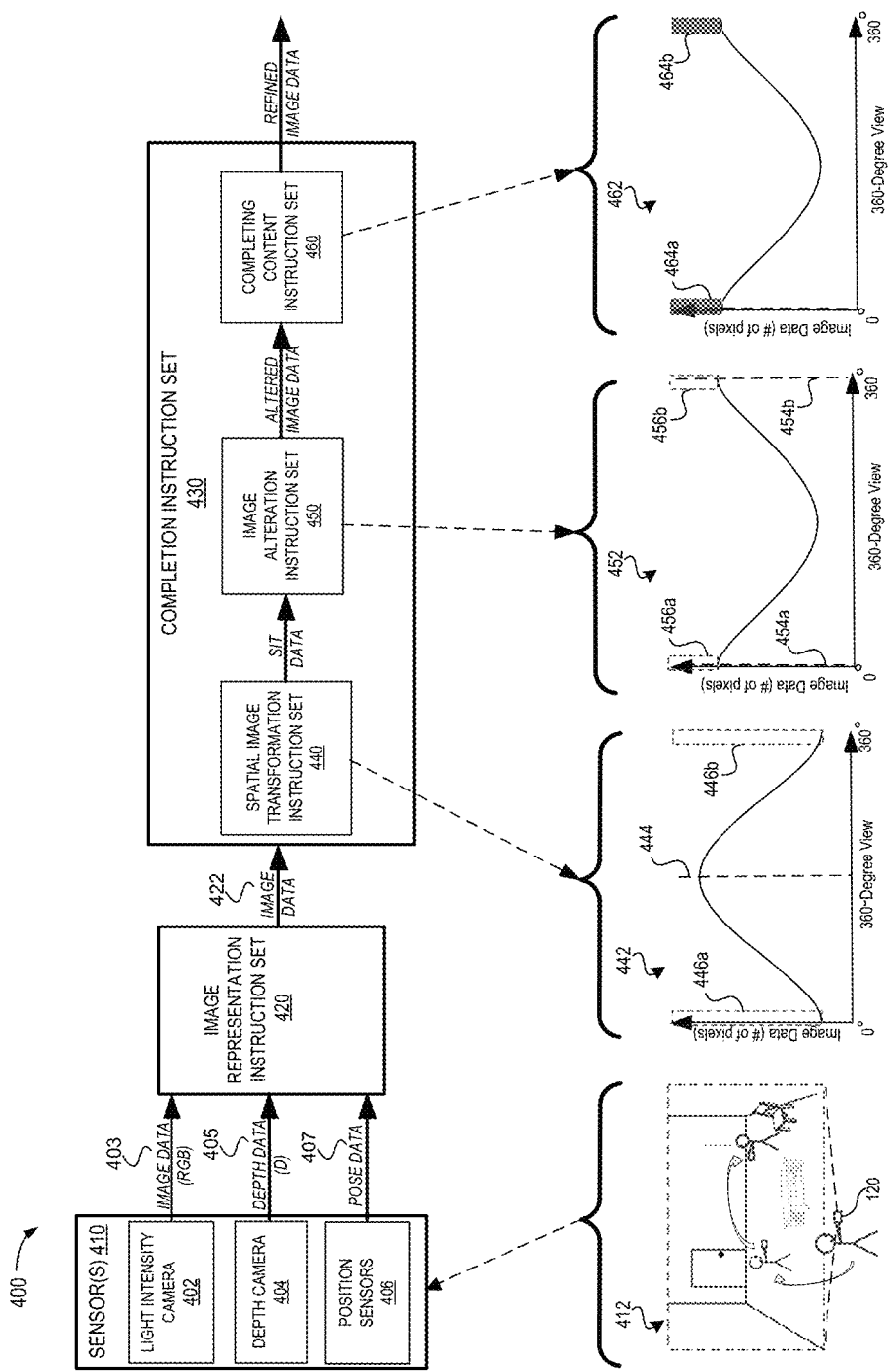
FIG. 4 illustrates an example completion of content in a missing part of an image in accordance with some implementations.

FIG. 4 is a system flow diagram of an example environment 400 in which a completion system can generate content in a missing part of an image according to some implementations. In some implementations, the system flow of the example environment 400 is performed on a device (e.g., server 110 or device 120 of FIGS. 1-3), such as a mobile device, desktop, laptop, or server device. The images of the example environment 400 can be displayed on a device (e.g., device 120 of FIGS. 1 and 3) that has a screen for displaying images and/or a screen for viewing stereoscopic images such as a head-mounted device (HMD). In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

The system flow of the example environment 400 acquires image data from sensors of a physical environment (e.g., the physical environment 105 of FIG. 1), generates an intermediate image representation of the image data, assesses the image representation of image data to determine a spatial image transformation for the image based on the defined content and the missing parts of the image, alters the image by applying the spatial image transformation, and completes (e.g., via synthesizing) the altered image. For example, a completion technique described herein determines a spatial (or geometric) image transformation (which may be just a shift, but also may be any generic image warp), that maximizes the ratio of known pixels at certain image positions (e.g., the left and right image boundaries), given certain constraints on the spatial image transformation (e.g., smoothness).

In an example implementation, the environment 400 includes an image composition pipeline that acquires or obtains data (e.g., image data from image source(s) such as sensors 410) of the physical environment. Example environment 400 is an example of acquiring image sensor data (e.g., light intensity data, depth data, and position information) for a plurality of image frames. For example, image 412 represents a user acquiring image data as the user scans a room in a physical environment (e.g., the physical environment 105 of FIG. 1). The image source(s) may include a depth camera 404 that acquires depth data 405 of the physical environment, a light intensity camera 402 (e.g., RGB camera) that acquires light intensity image data 403 (e.g., a sequence of RGB image frames), and position sensors 406 to acquire positioning information. For the positioning information 407, some implementations include a visual inertial odometry (VIO) system to determine equivalent odometry information using sequential camera images (e.g., light intensity data 403) to estimate the distance traveled. Alternatively, some implementations of the present disclosure may include a SLAM system (e.g., position sensors 406). The SLAM system may include a multi-dimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 400 includes an image representation instruction set 420 that is configured with instructions executable by a processor to generate an image representation from sensor data. For example, the image representation instruction set 420 acquires data from sensors 410 such as light intensity image data 403 (e.g., live camera feed such as RGB from light intensity camera 402), depth image data 405 (e.g., depth image data such as depth from depth camera 404), and other sources of physical environment information (e.g., camera positioning information 407 such as position and orientation data, e.g., pose data, from position sensors 406) of a physical environment (e.g., the physical environment 105 of FIG. 1), and generates an intermediate image representation 422. For example, the intermediate image representation 422 can include a world-aligned or object-aligned or gravity-aligned environment map, e.g., represented as an equirectangular image. In some implementations, the intermediate image representation 422 can include pixels with unknown image content, while the original image data from the sensors (e.g., sensors 410) may not have pixels with unknown image content. The intermediate image representation 422 can also accumulate image content from multiple camera viewpoints over time, e.g., in a single environment map stored as equirectangular image.

In an example implementation, the environment 400 includes a completion instruction set 430 that is configured with instructions executable by a processor to generate content in a missing part of an image using one or more techniques disclosed herein. For example, the completion instruction set 430 (e.g., completion instruction set 242 of FIG. 2 and/or completion instruction set 342 of FIG. 3) analyzes the intermediate image representation data 422 from the image representation instruction set 420 to determine a spatial image transformation for the image based on the defined content and the missing parts of the image, alters the image by applying the spatial image transformation, and completes (e.g., via synthesizing) the altered image. This completing content process of example environment 400 is further described herein with reference to FIGS. 5-7B.

In some implementations, the completion instruction set 430 includes an spatial image transformation instruction set 440 that is configured with instructions executable by a processor to assess the intermediate image representation data 422 from the image representation instruction set 420 to determine a spatial image transformation for the image based on the defined content and the missing parts of the image. In some implementations, spatial image transformation instruction set 440 identifies which slice of the image data would require the least amount of completion. For example, selecting the slice may involve determining how much of each slice (e.g., a number of pixels, a percentage of pixels, or the like) have defined versus missing content and selecting the vertical slice that has the least amount of missing content/most defined content. For example, graph 442 depicts a graphical example of image data acquired for a 360-degree view. The spatial image transformation instruction set 440 can identify a slice (e.g., a vertical slice) of image data that has the most known image data at slice 444, which has the least amount of missing data. Area 446a at the left most edge and area 446b at the right most edge are illustrated for comparison to slice 444 regarding the amount of data. Area 446a represents a slice of data at the 0-degree mark of the image (e.g., the left edge), and area 446b represents a slice of data at the 360-degree mark of the image (e.g., may have some content mismatch or other inconsistent alignment issues. In some implementations, spatial image transformation instruction set 440 can analyze image data that includes textures of 3D object meshes that need to be completed, or surface textures that need to be completed such that they become tile-able.

In an example implementation, the completion instruction set 430 includes an image alteration instruction set 450 that is configured with instructions executable by a processor to obtain the image data with identified slices from the spatial image transformation instruction set 440 and alter or shift the image such that the identified slice is located at one or both the far left edge and the far right edge of the image (e.g., a 2D rectangular environment map). In some implementations, altering the image is based on the selected slice, where the selected slice is positioned at one or more opposing edges (e.g., at the left edge, at the right edge, or divided onto both the left and right edges) of the altered image. The opposing edges (e.g., left and right edges) of the altered image can correspond to adjacent areas of the 360-degree view of the environment. For example, altering the image may involve shifting the image so that the selected slice is at one of the edges. Additionally, or alternatively, altering the image may involve shifting the image so that the selected slice is divided at the left and right edges of the altered image. Graph 452 depicts a graphical example of data for a 360-degree view similar to graph 442, except that the image alteration instruction set 450 has shifted the image data by splicing the most known slice of data (e.g., slice 444) at the 0-degree and 360-degree mark (e.g., the left and right edges). Thus, the least amount of missing data is located at area 456a and area 456b, at the left edge 454a and the right edge 454b, respectively, of the altered image data. The altered image data is then sent to the completing content instruction set 460.

In an example implementation, the completion instruction set 430 further includes a completing content instruction set 460 that is configured with instructions executable by a processor to obtain the altered (e.g., shifted) image data from the image alteration instruction set 450 and complete (e.g., via synthesizing) the altered image (e.g., generate content for the identified slice at the far left edge and/or the far right edge of the altered/shifted image). For example, for the selected slice of the image (e.g., the slice that was determined to include the least amount of missing content) that has then been shifted to the edge as an altered image, the method involves filling in the missing content. By using the selected slice, the least amount of content is necessary to be generated at the edge(s), thus causing the least amount seams in a 360-degree view when stitching the edges together. In some implementations, after adding the content, the image may be shifted back to its original perspective for certain applications (e.g., a live view). As illustrated in graph 462, completing content instruction set 460 has completed content for the image, including content at area 464*a* and area 464*b*, the left and right edges, respectively, of the altered image data. This completing content process of example environment 400 is further described herein with reference to FIGS. 5-7B.

Figure 5:
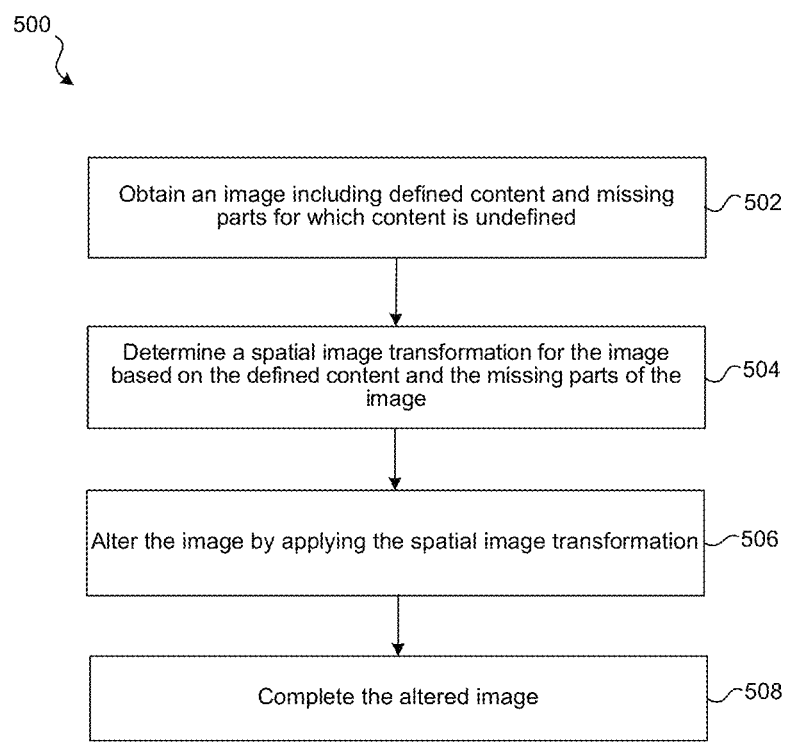
FIG. 5 is a flowchart representation of an exemplary method that completes content in a missing part of an image in accordance with some implementations.

FIG. 5 is a flowchart representation of an exemplary method 500 that completes (e.g., via synthesizing) content in a missing part of an image in accordance with some implementations. For example, a completion technique described herein determines a spatial (or geometric) image transformation (which may be just a shift, but also may be any generic image warp), that maximizes the ratio of known pixels at certain image positions (e.g., the left and right image boundaries), given certain constraints on the spatial image transformation (e.g., smoothness). In some implementations, the method 500 is performed by a device (e.g., server 110 or device 120 of FIGS. 1-3), such as a mobile device, desktop, laptop, or server device. The method 500 can be performed on a device (e.g., device 120 of FIGS. 1 and 3) that has a screen for displaying images and/or a screen for viewing stereoscopic images such as a head-mounted device (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). The process of completing (e.g., synthesizing) content in a missing part of an environment map (e.g., a 2D rectangular environment map) that represents a full 360-degree view of an environment of method 500 is illustrated with reference to FIG. 6.

At block 502, the method 500 obtains an image including defined content and missing parts for which content is undefined. For example, the image has edges that will be placed adjacent to one another. In some implementations, the image may be an incomplete environment map of a physical environment, such as a room. In some implementations, luminance values, color values, depth values, or other values descriptive of the content represented by portions of the image (e.g., pixels) may be unknown (not defined) and may plausibly be completed in multiple different ways. In some implementations, the image may be an incomplete equirectangular representation or cube map that defines values for some but not all of its pixels representing a 360-degree view of an environment in which left and right edges will be adjacent to one another. In some implementations, the image is a surface used as a tile-able texture in which edges will be adjacent to one another, or a texture of a 3D mesh having edges that will be adjacent to one another in the 3D mesh.

In some implementations, the missing part includes pixels for which luminance values, depth values, color attribute values, texture values, or other values descriptive of the content represented by portions of the image (e.g., pixels) are unknown prior to generating the content. In some implementations, the image includes a camera image, a digital photograph, a computer-generated image, an image that combines real and virtual content, an equirectangular representation representing a 360-degree view of an environment in which left and right edges will be adjacent to one another, a cube map representation of a 360-degree view of a 3D environment a surface representing a tile-able texture in which edges will be adjacent to one another, or a texture of a three-dimensional (3D) mesh having edges that will be adjacent to one another in the 3D mesh. Such a representation may have a missing part, e.g., pixels not having any color values due to corruption or the camera that provided the representation not capturing enough data.

At block 504, the method 500 determines a spatial image transformation for the image based on the defined content and the missing parts of the image. For example, the spatial image transformation may reposition a portion of the image at one or more edges. In some implementations, spatial image transformation may involve selecting the portion (e.g., a vertical slice) from multiple image portions (e.g., all vertical slices) based on determining how much of each portion (a number of pixels, a percentage of pixels, or the like) has defined versus missing content and selecting the portion (e.g., slice) that has the least amount of missing content/most defined content. In some implementations, the selection may account for the image representing a spherical projection. For example, pixels near the centerline/equator representing more content than pixels towards the top/bottom or polar regions.

In some implementations, the image includes multiple slices that are vertical slices of one or more pixel columns. In some implementations, the method involves selecting a slice (e.g., a vertical slice of one or more pixel columns) of multiple slices of the image based on content and missing parts in each of the multiple slices. In other words, the method may identify which slice of the image data would require the least amount of completion. For example, selecting the slice may involve determining how much of each slice (e.g., a number of pixels, a percentage of pixels, or the like) have defined versus missing content and selecting the slice that has the least amount of missing content/most defined content. In some implementations, selecting the slice includes determining how much of each slice of the multiple slices have defined content versus missing content, and selecting the slice that has the least amount of missing content or, conversely, selecting the slice that has the most amount of defined content. In some embodiments, the slice is further determined based on the orientation of the slice in world coordinates relative to the position of the user. In some embodiments, the slice is selected to face away from the user (e.g., so the seam is located where it is least visible to the user).

In some implementations, altering the image is based on selecting a slice to be positioned at one or more opposing edges (e.g., at the left edge, at the right edge, or divided onto both the left and right edges) of the altered image. The opposing edges (e.g., left and right edges) of the altered image can correspond to adjacent areas of a 360-degree view of environment. For example, altering the image may involve shifting the image so that the selected slice is at one of the edges. Additionally, or alternatively, altering the image may involve shifting the image so that the selected slice is divided at the left and right edges of the altered image.

In some implementations, the image is a 2D image including distortion resulting from projecting spherical 3D data to form the 2D image, where the spatial image transformation is selected based on the distortion.

At block 506, the method 500 alters the image by applying the spatial image transformation. For example, applying a geometric transformation or warp to the image to reposition a selected portion (e.g., slice) at one or more opposing edges (e.g., at the left edge, at the right edge, or divided onto both the left and right edges). For example, altering the image may involve shifting the image so that the selected slice is at one of the edges. Additionally, for a scanned texture of a real object, altering the image may involve shifting the UV coordinates (e.g., texture coordinates) to minimize the number of unknown pixels at the border/discontinuity, e.g., of a cylindrical projection. Additionally, for an image that includes part of a surface that may be needed to generate a rectangular tile-able texture, altering the image may involve moving as many known pixels to the image borders as possible before completing the image.

In some implementations, the spatial image transformation repositions a portion of the image at one or more edges of the altered image. In some implementations, the portion of the image is a vertical slice and the spatial image transformation includes shifting the image (e.g., horizontally) so that the vertical slice is at an edge of the image or divided between two edges of the image. In some implementations, the portion of the image is a vertical slice selected based on how much of each vertical slice of multiple vertical slices of the image is defined or undefined.

At block 508, the method 500 completes (e.g., via synthesizing) the altered image. For example, the method involves generating new/additional content for the missing parts of the image. For example, for the selected slice of the image (e.g., the slice that was determined to include the least amount of missing content) that has then been shifted to the edge as an altered image, the method involves filling in the missing content. By using the selected slice, the least amount of content is necessary to be generated, thus causing the least amount seams in a 360-degree view when stitching the edges together. In other words, since the amount of completion needed at the right and left ends of the image is smaller, the resulting "seam" that will appear when you stitch the image together to form a 360 view will be decreased. In some implementations, after adding the content, the image may be shifted back to its original perspective for certain applications (e.g., a live view).

In some implementations, generating the content includes using a machine-learning model to generate the content, wherein the machine-learning model is a regression-based neural network. In some implementations, the machine learning model may be trained to generate content for the missing part that appears plausible by learning to generate content that cannot be distinguished from real image content, for example, using adversarial loss-based training. To generate the content, a probabilistic classifier may be used to select color attribute values (e.g., RGB values) for each pixel of the missing part of the image. To do so, a pixel color attribute is segmented into a number of bins (e.g., value ranges) that are used as classes. The classifier determines probabilities for each of the bins of the pixel color attribute for each pixel and generates the content by selecting the bin for each color attribute for each pixel having the highest probability. In some implementations, generative adversarial neural networks (GANs) can be used to generate image content to generate new data such as images with the same statistics as a training set. For example, a GAN trained on photographs may generate new images that look plausible to human observers, having many real characteristics similar to those of the training photographs. GANs may be used to generate content by determining pixel color values (e.g., predicting each of the red, green, and blue color channels) for pixels of an image or part of an image to provide content that looks like a plausible scene. A conditional GAN may take as input a partial image and outputs a completed image in which the known parts (e.g. pixels) of the partial image are being reproduced in the completed image and the remaining unknown pixels are filled with hallucinated/synthesized image content that is consistent with and continuous to the known parts.

In some implementations, the generating the content can take as additional input a binary mask indicating which pixels are known and which are unknown. In some implementations, the generating the content can include generating values following a noise distribution for the unknown pixels. In some implementations, the generating the content can take as additional input semantic information, such as global environment type (e.g. "kitchen", "bedroom", "backyard"), or per-pixel semantic labels for the known parts of the image (e.g. "floor", "wall", "window", "door", "furniture", "ceiling"). In some implementations, the generating the content can take as additional input ISP parameters (e.g. exposure duration) or statistics (e.g. exposure target offset) indicative of how the image has been captured and processed. In some implementations, the generating the content can take as additional input readings from sensors that measure brightness, such as ambient light sensors (ALS) or photo diodes.

In some implementations, the method further includes altering the completed altered image to undo the spatial image transformation. For example, after adding (e.g., completing) the content, the image may be shifted back to its original perspective for certain applications.

In use, for the process 500, a user (e.g., user with device 120 in FIG. 1) may acquire images of a room with a device (e.g., a smartphone such as device 120) and the processes described herein would acquire sensor data (image data and positioning information), generate image(s) or representations of an environment (e.g., an environment map represented as an equirectangular image), and for each image representation, determine a spatial image transformation for the image based on the defined content and the missing parts of the image (e.g., detect a most-known column (e.g., a slice) of data for each image), alter/shift the image based on the detected column, and complete (e.g., generate) content at the edges of the altered image. Thus, as shown and discussed above with reference to FIG. 4, a completion instruction set 430 (e.g., completion instruction set 242 of FIG. 2, and/or completion instruction set 342 of FIG. 3) receives an intermediate image representation of image data and completes content at the edges of an altered image, where the image is adjusted prior to the completion to reduce/minimize the amount of content completed (e.g., at the left and right edges).

Figure 6:
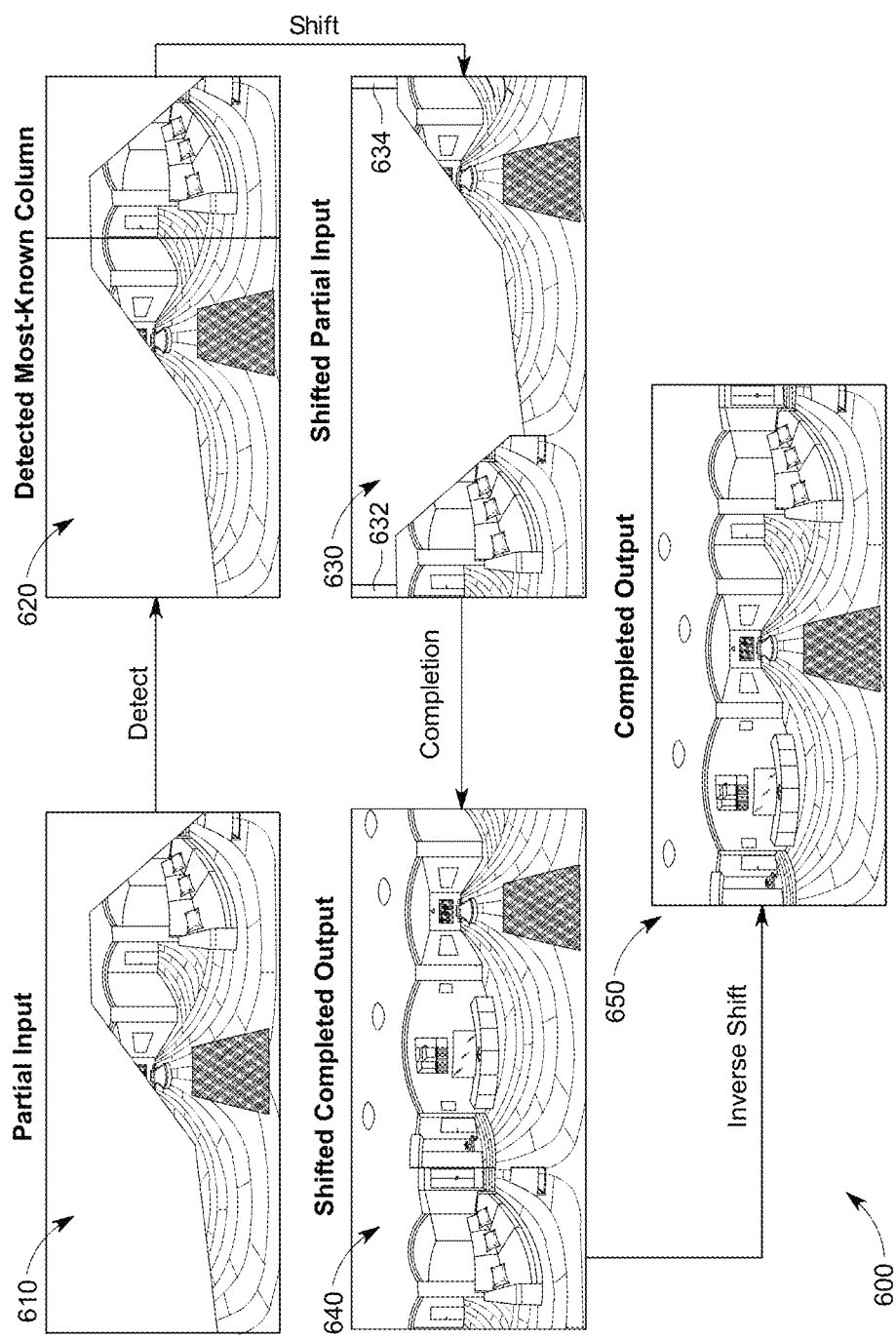
FIG. 6 illustrates an example completion of content in a missing part of an environment map that represents a full 360-degree view of an environment in accordance with some implementations.

FIG. 6 is a block diagram illustrating an example generation of content in a missing part of an environment map that represents a full 360-degree view of an environment in accordance with some implementations. In particular, FIG. 6 illustrates an example environment 600 in which a completion system (e.g., completion instruction set 242 of FIG. 2, completion instruction set 342 of FIG. 3, and/or completion instruction set 430 of FIG. 4) can obtain image representation data (e.g., an environment map represented as an equirectangular image that represents a 360-degree view of the environment), determine a spatial image transformation for the image representation based on the defined content and the missing parts of the image (e.g., assess the image representation data to identify a slice of the image data that includes the most amount of data (e.g., least amount of missing data)), alter (e.g., shift) the image by applying the spatial image transformation (e.g., such that the identified slice is spliced and located on both the far left edge and the far right edge of the image), and complete the altered image (e.g., generate content for the missing content located at the identified slice at the far left edge and/or the far right edge of the altered/shifted image). For example, image 610 represents a partial image that is obtained by the completion system. The completion system detects the most known column (e.g., slice), as illustrated in image 620, using techniques described herein (e.g., selecting the vertical slice that has the least amount of missing content/most defined content). The identified most known slice is then shifted by the completion system in image 630, where the most known column is now spliced and located at the left most and right most edges of the image. Thus, the least amount of data missing is located at area 632 and area 634 for the left and right edges, respectively. The completion system completes content for the missing areas at the edges and then completes the shifted image as illustrated in image 640 to display the entire 360-degree view. Optionally, the completion system can shift back the image as illustrated by image 650. For example, the rug that was initially in the center view of the image 610, is now returned to the center view for image 650.

Figure 7A:
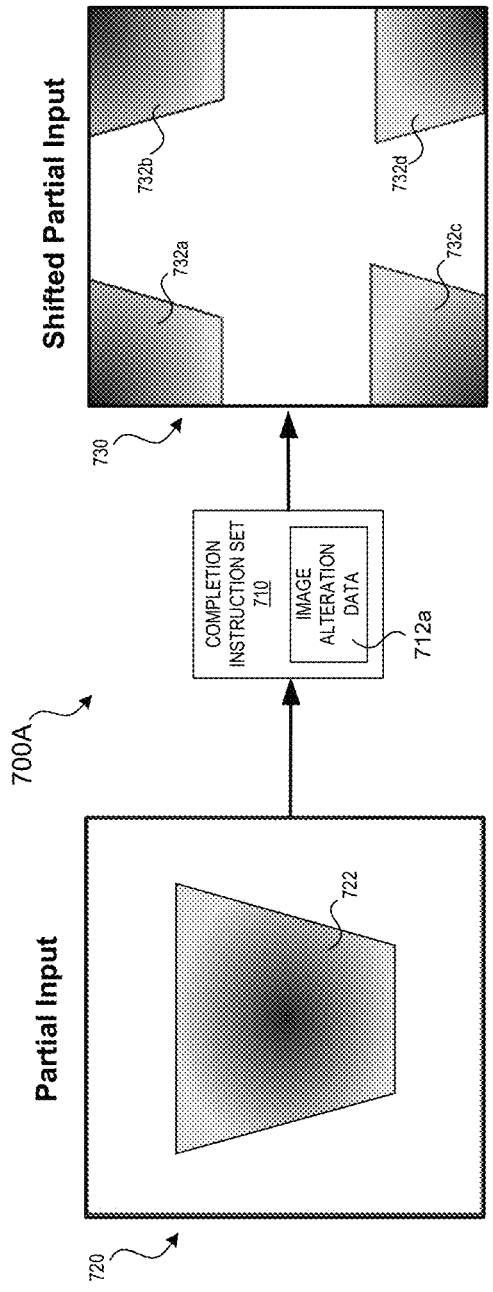
FIG. 7A illustrates an example alteration of a partial image of a surface in accordance with some implementations.

FIG. 7A illustrates an example alteration of a partial image of a surface into a tile-able texture in accordance with some implementations. For example, given a photo of a part of a surface image 722 in image 720, completion instruction set 710 (e.g., completion instruction set 242 of FIG. 2, completion instruction set 342 of FIG. 3, and/or completion instruction set 430 of FIG. 4) can generate a rectangular tile-able texture by extending the surface image 722 using the completion techniques described herein. For example, the completion instruction set 710 can determine a spatial image transformation for the image representation based on the defined content and the missing parts of the image (e.g., shown as white) and alter the image to move as many known pixels to the image borders as possible. Thus, the altered image 730 shows the surface 722 in four parts (e.g., surface part 732a, 732b, 732c, and 732d), each surface part 732 at a different respective corner of the altered image 730. The completion instruction set 710 can then use the altered image data 712a to complete the altered image. Optionally, the completion instruction set 710 can transform the surface image data back to the original coordinates as shown in image 720.

Figure 7B:
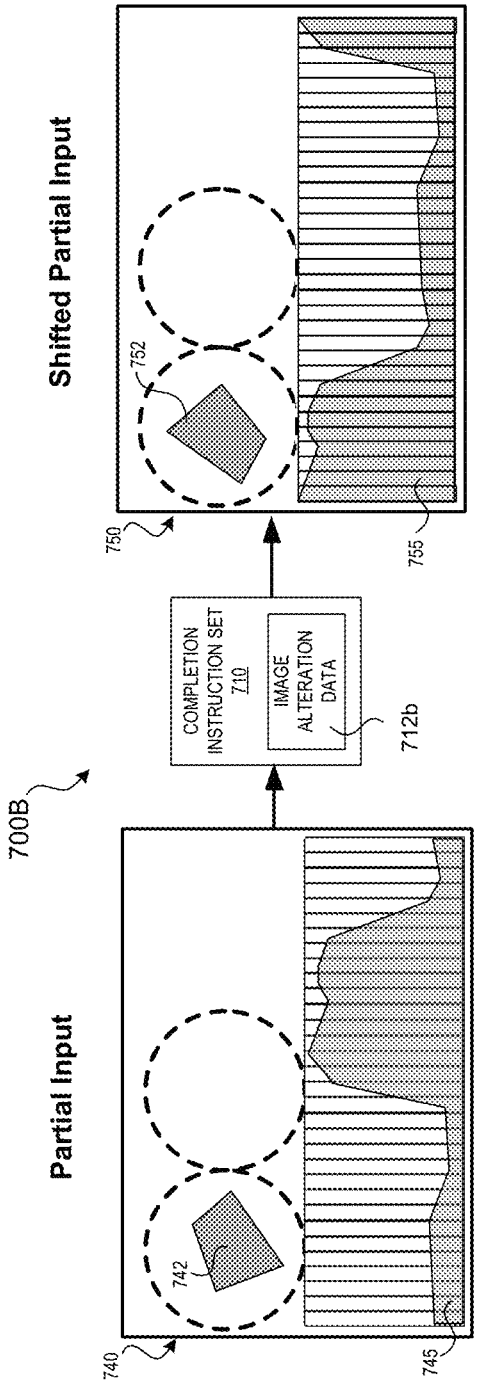
FIG. 7B illustrates an example alteration of a partial image of texture of a 3D mesh of an object in accordance with some implementations.

FIG. 7B illustrates an example alteration of a partial image of texture of a 3D mesh of an object in accordance with some implementations. For example, scanned texture of a real object, e.g., a vase, a stone, a teddy bear, wraps around the object and has a wrapping seam (e.g., a 0-degree to 360-degree transition) somewhere within the image data. In some implementations, the completion instruction set 710 (e.g., completion instruction set 242 of FIG. 2, completion instruction set 342 of FIG. 3, and/or completion instruction set 430 of FIG. 4) can use cylindrical projection or spherical projection or any other projection or mapping of texture coordinates. In some implementations, the entire geometry of the object can be acquired (e.g., retrieved from a database), and since only a part of an object may be visible in the image data (e.g., only the front), the completion techniques described herein can complete (e.g., synthesize) the texture of the remaining parts that were not observed and are therefore unknown in the object's texture. For example, image 740 illustrates a representation of texture coordinates of a cylinder that need to be completed, where the shaded area 742 and the shaded area 745 represents the known image content of the textures of the cylinder. The image and/or texture content can then be shifted the via the completion instruction set 710 to minimize the number of unknown pixels at the border/discontinuity, e.g., of a cylindrical projection. For example, image 750 represents the altered texture coordinates of the cylinder, where the shaded area 742 and the shaded area 755 represents the known image content of the textures of the cylinder. The shaded area 755 is shown as shifted to the right and left edges of the texture image data 750. This corresponds to a 3D rotation about the cylinder's axis. Accordingly, in this example, the shaded area 742, which may correspond to the partial texture of the top of the cylinder, has been transformed using an in-plane rotation (i.e. a spatial image transformation), resulting in shaded area 752. The completion instruction set 710 can then use the altered image data 712b to complete the altered image. Optionally, the completion instruction set 710 can transform back to original image/texture coordinates.

In some implementations, the image composition pipeline may include virtual content (e.g., a virtual box placed on the table 140 in FIG. 1) that is generated for an extended reality (XR) environment. In some implementations, the operating systems 230, 330 includes built in XR functionality, for example, including a XR environment application or viewer that is configured to be called from the one or more applications 240, 340 to display a XR environment within a user interface. For example, the systems described herein may include a XR instruction set that is configured with instructions executable by a processor to provide a XR environment that includes depictions of a physical environment including real physical objects and virtual content. A XR instruction set can generate virtual depth data (e.g., depth images of virtual content) and virtual intensity data (e.g., light intensity images (e.g., RGB) of the virtual content). For example, one of the applications 240 for the server 110 or applications 340 for the device 120 could include a XR instruction set that is configured with instructions executable by a processor to provide a XR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor:
        obtaining an image comprising defined content and missing parts for which content is undefined;
        determining a plurality of portions of the image;
        determining amounts of defined content in each of the portions based on the defined content and the missing parts of the image;
        identifying a first portion of the plurality of portions of the image based on comparing the amounts of defined content, wherein the first portion is identified based on the first portion having a first amount of defined content that is greater than a second amount of defined content in a second portion of the plurality of portions of the image, wherein the second portion is located along an end of the image;
        determining a spatial image transformation for the image based on identifying the first portion of the plurality of portions of the image;
        altering the image by applying the spatial image transformation, wherein applying the spatial image transformation changes locations of the first portion and the second portion relative to the end of the image such that the first portion is located along the end of the image; and
        completing the altered image.

2. The method of claim 1, wherein the missing parts comprise pixels for which luminance, depth, color, or texture values are undefined.

3. The method of claim 1, wherein the image comprises:
    an equirectangular representation representing a 360-degree view of an environment in which left and right edges will be adjacent to one another;
    a cube map representing the 360-degree view of the environment;
    a surface representing a tile-able texture in which edges will be adjacent to one another; or
    a texture of a three-dimensional (3D) mesh having edges that will be adjacent to one another in the 3D mesh.

4. The method of claim 1, wherein completing the altered image comprises generating new content for only the missing parts of the altered image.

5. The method of claim 4, wherein the new content is generated using a neural network.

6. The method of claim 1, wherein completing the altered image comprises generating new content for all of the altered image.

7. The method of claim 1, wherein the first portion of the image is a vertical slice and the spatial image transformation comprises shifting the image horizontally so that the vertical slice is at the first end or the second end of the image or divided between two edges of the image.

8. The method of claim 1, wherein the first portion of the image is a vertical slice selected based on how much of each vertical slice of multiple vertical slices of the image is defined or undefined.

9. The method of claim 1, wherein the image is a two-dimensional (2D) image comprising distortion resulting from projecting spherical three-dimensional (3D) data to form the 2D image, wherein the spatial image transformation is selected based on the distortion.

10. The method of claim 1, further comprising altering the completed altered image to undo the spatial image transformation.

11. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the device to perform operations comprising:
obtaining an image comprising defined content and missing parts for which content is undefined;
determining a plurality of portions of the image;
determining amounts of defined content in each of the portions based on the defined content and the missing parts of the image;
identifying a first portion of the plurality of portions of the image based on comparing the amounts of defined content, wherein the first portion is identified based on the first portion having a first amount of defined content that is greater than a second amount of defined content in a second portion of the plurality of portions of the image, wherein the second portion is located along an end of the image;
determining a spatial image transformation for the image based on identifying the first portion of the plurality of portions of the image;
altering the image by applying the spatial image transformation, wherein applying the spatial image transformation changes locations of the first portion and the second portion relative to the end of the image such that the first portion is located along the end of the image; and
completing the altered image.

12. The device of claim 11, wherein completing the altered image comprises generating new content for the altered image, wherein the new content is generated using a neural network.

13. The device of claim 11, wherein the first portion of the image is a vertical slice and the spatial image transformation comprises shifting the image horizontally so that the vertical slice is at the first end or the second end of the image or divided between two edges of the image.

14. The device of claim 11, wherein the first portion of the image is a vertical slice selected based on how much of each vertical slice of multiple vertical slices of the image is defined or undefined.

15. The device of claim 11, wherein the image is a two-dimensional (2D) image comprising distortion resulting from projecting spherical three-dimensional (3D) data to form the 2D image, wherein the spatial image transformation is selected based on the distortion.

16. A non-transitory computer-readable storage medium, storing program instructions executable on a device to perform operations comprising:
obtaining an image comprising defined content and missing parts for which content is undefined;
determining a plurality of portions of the image;
determining amounts of defined content in each of the portions based on the defined content and the missing parts of the image;
identifying a first portion of the plurality of portions of the image based on comparing the amounts of defined content, wherein the first portion is identified based on the first portion having a first amount of defined content that is greater than a second amount of defined content in a second portion of the plurality of portions of the image, wherein the second portion is located along an end of the image;
determining a spatial image transformation for the image based on identifying the first portion of the plurality of portions of the image;
altering the image by applying the spatial image transformation, wherein applying the spatial image transformation changes locations of the first portion and the second portion relative to the end of the image such that the first portion is located along the end of the image; and
completing the altered image.

17. The non-transitory computer-readable storage medium of claim 16, wherein the first portion of the image is a vertical slice and the spatial image transformation comprises shifting the image so that the vertical slice is at the first end or the second end of the image or divided between two edges of the image.

* * * * *